May 29, 1956 A. L. LEE 2,747,886
VERTICALLY ADJUSTABLE STEERING WHEEL AND SUPPORT ASSEMBLY
Original Filed Aug. 30, 1947 2 Sheets-Sheet 1
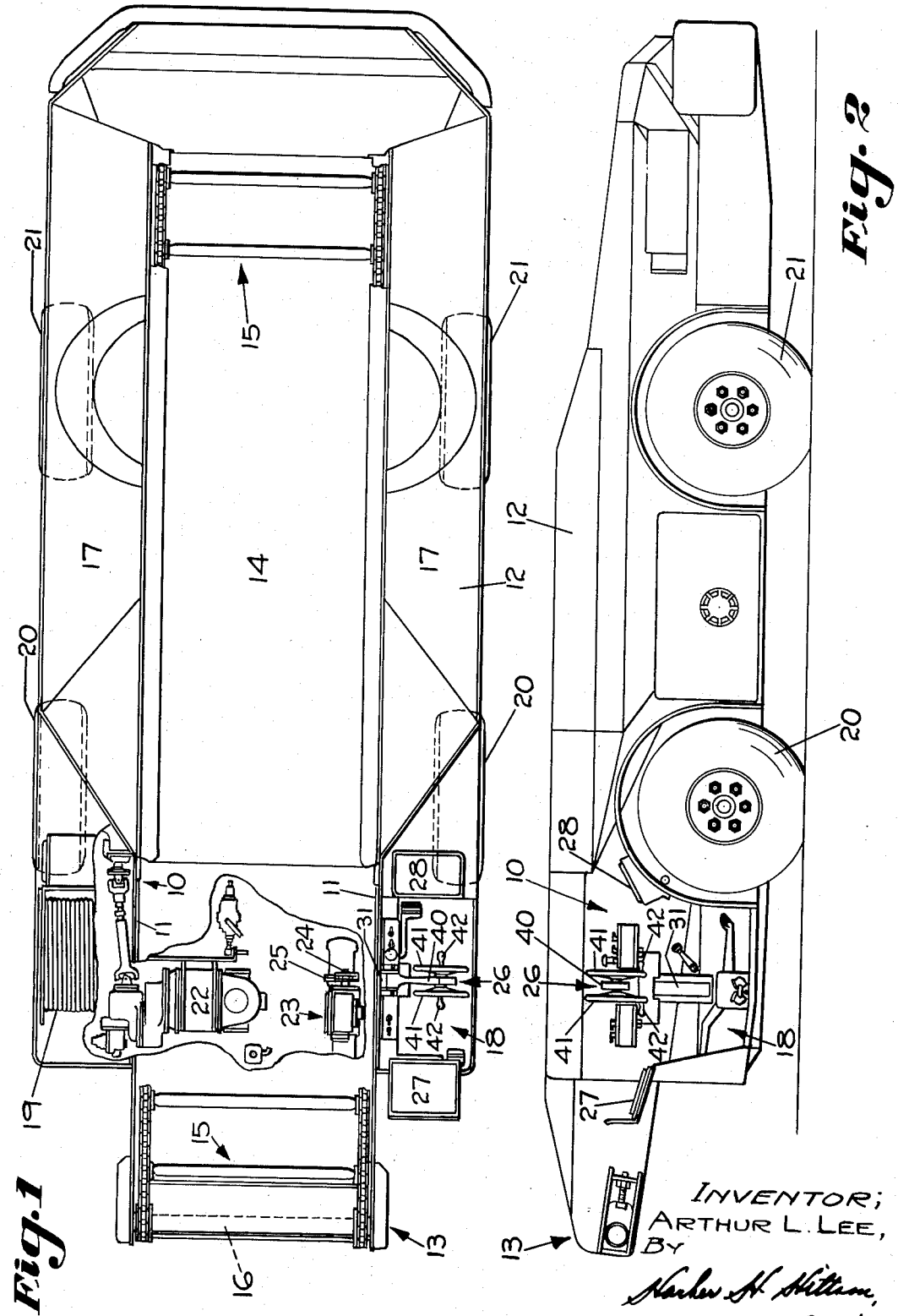
INVENTOR;
ARTHUR L. LEE,
BY
ATT'Y.

May 29, 1956 A. L. LEE 2,747,886
VERTICALLY ADJUSTABLE STEERING WHEEL AND SUPPORT ASSEMBLY
Original Filed Aug. 30, 1947 2 Sheets-Sheet 2
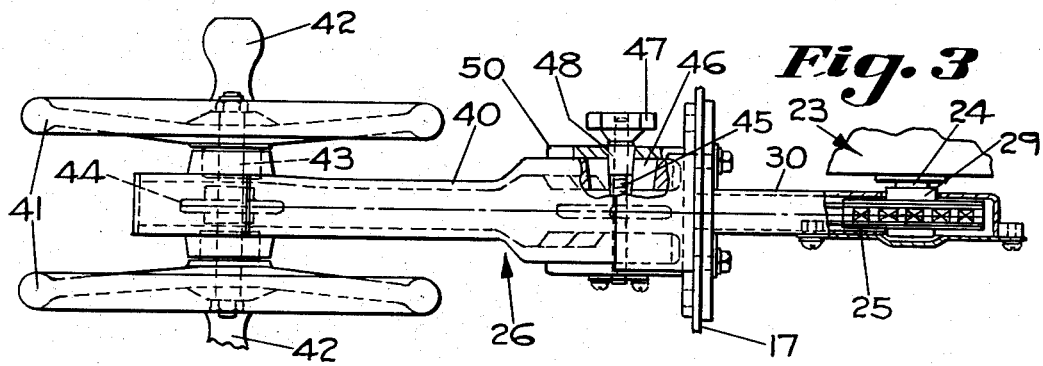
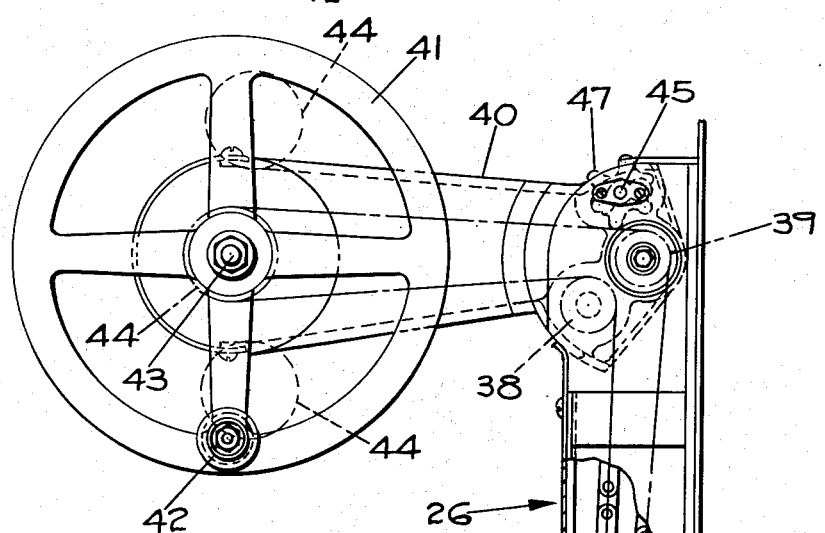
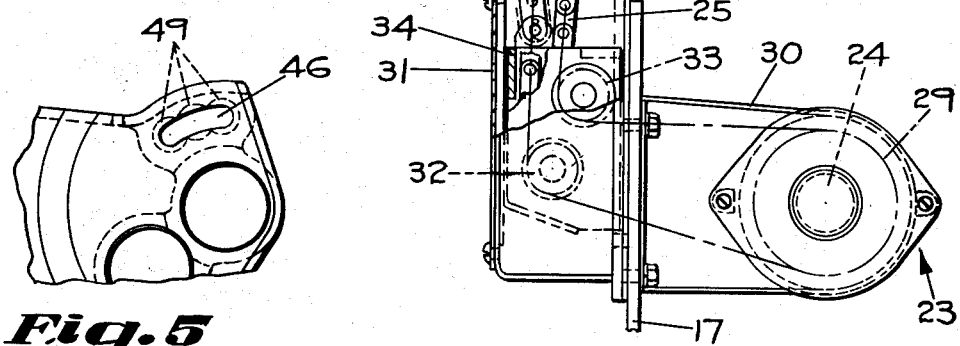
INVENTOR;
ARTHUR L. LEE,
BY
ATT'Y.

United States Patent Office 2,747,886
Patented May 29, 1956

2,747,886

VERTICALLY ADJUSTABLE STEERING WHEEL AND SUPPORT ASSEMBLY

Arthur L. Lee, Upper Arlington, Ohio, assignor to The Jeffrey Manufacturing Company, a corporation of Ohio Original application August 30, 1947, Serial No. 771,542, now Patent No. 2,618,491, dated November 18, 1952. Divided and this application January 3, 1951, Serial No. 204,213

1 Claim. (Cl. 280—87)

This invention relates to a shuttle car which is a vehicle designed particularly for carrying loose material such as coal between a loading machine adapted to operate in a coal mine room or the like and an entry conveyer or mine cars.

An object of the invention therefore is to provide an improved shuttle car.

A further object of the invention is to provide steering means for a shuttle car or the like in which the elevation of the steering wheel may be readily adjusted.

Other objects of the invention will appear hereinafter, the novel features and combinations being set forth in the appended claim.

In the accompanying drawings,

Fig. 1 is a plan view of a shuttle car incorporating the features of my invention with parts of the shuttle car omitted and parts broken away;

Fig. 2 is a side elevational view of the vehicle shown in Fig. 1;

Fig. 3 is a plan view of the steering column and associated operating wheel means, as well as other parts of the steering mechanism between the duplex operator's wheel and the booster-type steering gear, with parts being shown in section;

Fig. 4 is a combination elevational and sectional view of the mechanism of Fig. 3; and Fig. 5 is an enlarged view showing a detail of the steering arm of Fig. 3.

This application is a division of my co-pending application, Serial No. 771,542, filed August 30, 1947, and now Patent No. 2,618,491, dated November 18, 1952, for a Shuttle Car. It is to be understood that the construction and operation of the shuttle car and all of its appendages follow that of my parent application above identified, and that only the subject matter pertinent to the present invention is shown in the drawings and discussed herein in detail.

Referring particularly to Figs. 1 and 2 of the drawings, the shuttle car includes a main frame 10 having laterally spaced, longitudinally extending side members 11 which are connected by a plurality of cross members, not shown. Mounted on said main frame 10 is an elongated longitudinally extending body 12, adjacent the rear or discharge end of which there is a chute 13 adapted to overhang a mine car or entry conveyer into which coal from the body 12 is discharged. The bottom of the coal-carrying body 12 is formed by a bottom plate 14 of substantially uniform width. An endless chain and flight conveyer 15 has its upper or working run traveling over the bottom plate 14 with its return run traveling underneath said bottom plate 14. The conveyer 15 extends between a head shaft adjacent the front of the shuttle car that is driven by an electric motor, not shown, and a foot, tail or discharge shaft 16 at the rear end of the shuttle car. Many of the flights and portions of the chains of the chain and flight conveyer 15 are omitted in the drawings for the sake of clarity.

As clearly seen by reference to Fig. 1 of the drawings, the body 12 includes a pair of laterally spaced side walls 17 which are in part vertical and in part laterally sloping, to provide a maximum capacity for any given height. The side walls 17 converge adjacent the discharge end of the body and extend upright throughout the length of the discharge chute 13, thereby providing an operator's station 18 adjacent one side of the vehicle and within the extreme lateral confines thereof and adjacent said chute 13. At a similar position on the opposite side of the chute 13 an electric cable reel 19 is located, by which electric current may be derived for the several electric motors provided on the shuttle car.

The shuttle car is provided with four wheels, preferably provided with pneumatic tires, there being a pair of wheels 20 adjacent the rear or discharge end, and a pair of wheels 21 adjacent the front end. Each pair of wheels 20 and 21 is preferably driven through a differential by a separate electric motor, the motor for the pair of wheels 20 being seen at 22 in Fig. 1 of the drawings. The drive mechanism is disclosed in my parent application, Serial No. 771,542, now Patent No. 2,618,491, above identified, and it is claimed in my Patent No. 2,457,569, dated December 28, 1949, for a Shuttle Car.

Both pairs of wheels 20 and 21 are preferably steerable by interconnecting linkage mechanism which, because it forms no part of the present invention, is not shown. This mechanism is described and claimed in my parent application, Serial No. 771,542, now Patent No. 2,618,491.

Actuation of the above-mentioned interconnecting steering mechanism to effect steering of the vehicle is controlled by a standard mechanically operated, power boosted steering gear 23 of any well-known standard make, an illustration of which is the commercial Bendix-Ross steering gear. This steering gear 23 is rigidly attached to the main frame 10 by mechanism not disclosed in detail and is controlled by a driving control shaft 24 thereof through an endless chain 25 which is part of a steering wheel assembly 26, disclosed in detail in Figs. 3 through 5 of the drawings.

By reference to Figs. 1 and 2 of the drawings, it will be seen that the steering wheel assembly 26 is located at the operator's station 18, and it is mounted on one of the side walls 17, forming one side of the discharge chute 13. This steering wheel assembly is dual in character since the operator must be able to reverse his position in order to operate the shuttle car with equal facility whether traveling forwardly or reversely. To this end, there are dual controls at the operator's station 18, including separate seats 27 and 28, located on opposite sides of the steering wheel assembly 26.

Referring particularly to Figs. 3 through 5 of the drawings, it is to be seen that the endless chain 25 extends from a sprocket 29 on shaft 24 through a laterally extending casing 30 into the bottom of an upstanding post, casing or housing 31, which is directly connected to the afore-mentioned plate 17 of chute 13. Both runs of chain 25 in extending to the sprocket 29 which drives shaft 24 are in generally horizontal planes, and they pass over guide pulleys or rollers 32 and 33 mounted in an adjustable cage 34 located in the bottom of the post 31 and constituting part of a slack-adjusting mechanism for said chain 25. To adjust the slack of the chain 25, the cage 34 is movable by a bell crank 35 connected to the cage 34 by a link 36. An adjusting bolt 37, the head of which is exposed to the outside of post 31, may be adjusted thereby to adjust the position of cage 34, and the tension of chain 25. Both runs of the chain 25 extend substantially upward through the post 31 and pass over pulleys or rollers 38 and 39 mounted adjacent to the top thereof, from which they extend through a hollow arm or bracket 40 which is pivotally attached adjacent top of post 31 for swinging movement on a horizontal axis.

At its outer end, the arm or post 40 carries a double wheel 41 which is mounted for rotation on a horizontal axis, each wheel 41 preferably being provided with an operating handle 42. The double wheel 41 is keyed to rotate a shaft 43 journaled in the outer end of arm 40 and carrying a drive sprocket 44 which receives the chain 25 and drives it. It is obvious that rotary movement of the wheel 41 will be transferred to the shaft 24 of the steering mechanism 23, thus providing for the steering of the four wheels 20 and 21 of the shuttle car.

The combination of the steering wheel, its supporting mechanism, the chain and the rollers therefor are described and claimed in my co-pending application, Serial No. 204,214, filed January 3, 1951, now Patent 2,681,234, for a Shuttle Car Including Improved Steering Means, now Patent No. 2,681,234, issued June 15, 1954.

It is desirable to be able to adjust the effective height of the dual wheel 41 and to this end the inner end of arm 40 is mounted for pivotal adjustment with respect to the post 31, and it may be locked in any one of three adjustable positions. The locking mechanism takes the form of a threaded bolt 45 which extends through an elongated slot 46 in the arm 40. The bolt 45 is provided with a hand wheel 47 having a tapered cylindrical base 48 adapted to be received selectively by any of three overlapping tapered cylindrical or frusto-conical holes 49 associated with the slot 46. This, in effect, provides a scalloped slot, and it is evident that the tapered base 48 may be selectively wedged into any of the three tapered receptacle portions 49 to lock the arm 40 in position, since the hand nut 47 is held in fixed plate 50 attached to and forming a part of the post 30.

From the foregoing description, it is obvious that I have provided an improved shuttle car wherein the area occupied by an operator's legs when he is seated on either seat 27 or 28 contains no steering mechanism, and this is particularly desirable because, for example, an operator, in the event of an emergency, may readily abandon the shuttle car, or he may change from the seat 27 to the seat 28 and vice versa more easily because the customary upright steering post between his legs is eliminated by this invention.

Obviously those skilled in the art may make various changes in the details and arrangement of parts without departing from the spirit and scope of the invention as defined by the claim hereto appended, and applicant therefore wishes not to be restricted to the precise construction herein disclosed.

Having thus described and shown an embodiment of the invention, what it is desired to secure by Letters Patent of the United States is:

A shuttle car including a load carrying body having a generally upright side wall and an operator's station at one side of said wall, oppositely facing operators' seats at said operator's station, steering mechanism for said shuttle car located at said operator's station constructed and arranged so as to provide leg room for an operator free of steering mechanism, said steering mechanism including an arm extending laterally and generally horizontally outwardly into said operator's station between said seats and above the legs of an operator seated thereon and on an axis transverse to the direction in which said operator faces, a pair of oppositely facing steering wheel means on the outer end of said arm on an axis extending transversely thereof, means mounting the inner end of said arm on said upright wall for pivotal movement about a horizontal axis thereby to adjust the effective height of said steering wheel means, and locking means adjacent the inner end of said arm including a scalloped edged slot and a tapered clamping hand operated means cooperating with said scalloped edged slot.

References Cited in the file of this patent

UNITED STATES PATENTS

| | | |
|---|---|---|
| 198,194 | Emmitt | Dec. 18, 1877 |
| 203,743 | Kuntz et al. | May 14, 1878 |
| 1,231,292 | Parrett | June 26, 1917 |
| 1,805,536 | White | May 19, 1931 |
| 2,079,536 | Thurber | May 4, 1937 |
| 2,358,236 | Lee | Sept. 12, 1944 |
| 2,378,892 | Arentzen | June 26, 1945 |

FOREIGN PATENTS

| | | |
|---|---|---|
| 17,057 | Great Britain | Aug. 5, 1903 |
| 434,896 | Great Britain | Sept. 11, 1935 |